United States Patent
Mundra et al.

(10) Patent No.: US 7,193,739 B2
(45) Date of Patent: Mar. 20, 2007

(54) REAL TIME FAX-OVER-PACKET FOR BROADBAND ACCESS GATEWAYS

(75) Inventors: Satish Mundra, Germantown, MD (US); David A. Lide, Rockville, MD (US); Edward N. George, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 972 days.

(21) Appl. No.: 10/209,912

(22) Filed: Aug. 2, 2002

(65) Prior Publication Data

US 2004/0021894 A1 Feb. 5, 2004

(51) Int. Cl.
*G06F 15/00* (2006.01)
*H04N 1/00* (2006.01)
*H04M 11/00* (2006.01)

(52) U.S. Cl. .................. 358/1.15; 358/401; 358/405; 379/93.15

(58) Field of Classification Search ............. 358/1.15, 358/401, 405; 379/93.15; 709/200
See application file for complete search history.

(56) References Cited

U.S. PATENT DOCUMENTS 6,407,996 B1 * 6/2002 Witchalls .................. 370/352
6,934,045 B1 * 8/2005 Vialle et al. ............... 358/1.15
6,940,861 B2 * 9/2005 Liu et al. ................. 370/395.21
6,990,112 B1 * 1/2006 Brent et al. ................ 370/401

* cited by examiner

*Primary Examiner*—Twyler Lamb
*Assistant Examiner*—Houshang Safaipour
(74) *Attorney, Agent, or Firm*—Steven A. Shaw; W. James Brady; Frederick J. Telecky, Jr.

(57) ABSTRACT

The invention teaches elimination of the need for allocating a telephony port or equivalent processor resource for real-time facsimile transmission through a broadband access gateway by replacing a fax modem or analog fax machine with a computer system having a network connection to the gateway. A software application on the computer uses a serial port redirector that provides a virtual communication port for facsimile software applications that would otherwise use a fax modem on a computer. The port redirector captures fax data sent to a serial communication port on the computer and sends it to the virtual fax module on the gateway. The gateway has a virtual fax software application associated which emulates a Class 1 or Class 2 fax modem interface from the client-side PC. The gateway uses a codec to convert fax data into ITU T.38 standards for "Procedures for real-time Group 3 facsimile communication over IP networks". Packetized T.38 facsimile data is then transmitted to a far-end gateway that may be located at a central office (CO) of a telephone company or other network. The elimination of a telephony port in the gateway allows for the simplified approach to sending and receiving fax over IP networks by reducing the processing complexity in the system and frees up telephony resources in the gateway device.

11 Claims, 4 Drawing Sheets

REAL TIME FAX-OVER-PACKET FOR BROADBAND ACCESS GATEWAYS

CROSS-REFERENCE TO RELATED APPLICATIONS

None

FIELD OF THE INVENTION

The present invention relates generally to realtime facsimile transmissions over a digital network, and more specifically eliminating the need for allocating a telephony port or equivalent processor resource for facsimile transmission and reception through a broadband access gateway.

BACKGROUND OF THE INVENTION

A fax over packet application enables the interworking of standard fax machines with packet networks. The traditional method extracts the fax image from a fax machine's analog signal and carries it as digital data over the packet network. Packet networks used to transport the fax include Internet (IP), Frame Relay, and ATM. Fax data in its original form is digital, however it is modulated and converted to analog for transmission over the public switched telephone network (PSTN). The fax over packet interworking functions reverses the analog conversion, instead transmitting digital data over the packet network, and then reconverting the digital data to analog for the receiving fax machine. This conversion process reduces the overall bandwidth required to send the fax because the digital form is much more efficient and the fax transmission is half duplex.

Various protocols exist for transmission and receipt of facsimiles over low-delay analog voice-grade telephone lines. Once such protocol is Group 3 (G3), defined in Recommendation T.30, "Procedures for document facsimile transmission in the general switched telephone network", which is hereby incorporated herein by reference. T.30 is an International Telecommunication Union (ITU) recommendation for facsimile transmissions over a telephone network. The T.30 protocol describes the formatting of non-page data, such as messages that are used for capabilities negotiation. The recommendation defines three different protocols for facsimile transfer, Group 1, 2 and 3, Only Group 3 (G3) is in common use today. While the G3 protocol is defined for analog transmission, the backbone network for modern telephone systems is generally digital. In addition, the ITU Recommendation T.38 "Procedures for real-time Group 3 facsimile communication over IP networks" defines realtime protocols for transmission of realtime fax over an IP network. When facsimile devices are connected through a digital network, such as packet, ATM, or Frame Relay, the sending and receiving devices are not directly connected. In a packet network, the facsimile information is packetized at a sending end, sent over the packet network, and reassembled into a facsimile format at the receiving end before presentation to the receiving facsimile device. The connection over a packet network is not a constant connection and often experiences line delays, errors, and/or packet loss which must be hidden from the facsimile device by a gateway in order to avoid error detection by the receive fax device.

Broadband access devices, such as cable modems or digital subscriber line (DSL) modems, are increasingly expected to provide IP telephony services in addition to high-speed data. They are typically expected to have two or more RJ11 ports for telephony services that would accommodate either two telephone extensions or a telephone and fax machine. For the end user, the telephony/data ports are expected to look and act similar to a standard analog telephone line for use in making local and long-distance telephone calls as well as for sending fax transmissions (and potentially even dial-up modems under rare circumstances). However, for the service provider, each telephony port adds significantly to the device costs and computational requirements, including the type and number of digital signal processors (DSP) in an access device and the processing resources, such as MIPS (Millions of Instructions Cycles Per Second) dedicated to each port. What is needed is the capability of a low-cost broadband access gateway to support fax transmission and reception without having to allocate a telephony port and DSP resource to a fax modem on a computer or an analog fax machine.

SUMMARY

A fax modem in a PC uses a serial communication port (COM port) to transmit fax signals. The preferred embodiment of the present invention enables the use of a personal computer (PC)-based facsimile software application to transmit and receive faxes without the use of a fax modem. Using the present invention, a dedicated fax port on an access gateway is not needed. If a PC fax application is using a fax modem, then the fax modem is no longer needed to send faxes. The facsimile application instead connects to a broadband access gateway using a TCP socket over an existing network connection between the PC and the gateway. The invention eliminates the need for allocating a telephony port and associated processing resources for facsimile transmission and reception through a broadband access gateway. The elimination of the telephony port on a gateway is accomplished using a serial port redirector module on a client-side personal computer. The serial port redirector module provides a virtual COM port for facsimile software applications on a computer. The virtual corn port operating as a serial port redirector on the PC receives the fax intended for a COM port and sends the fax through a network connection to the gateway's TCP port.

The port redirector module captures the fax data that is sent through a computer's serial COM port to a fax modem and encapsulates the data with Transmission Control Protocols (TCP). Thereafter the data is sent through a TCP socket for transmission over an Ethernet network connection between the PC and gateway. The redirector also unencapsulates any TCP data received through the Ethernet connection from a transmitting fax and provides the data to the fax software application. The serial port redirector is invisible to the fax software application which thinks the transmissions are occurring through the PC's traditional COM port. The elimination of a telephony port in the broadband access gateway allows for a simplified way for sending and receiving faxes over IP networks. The invention reduces the processing complexity in the system and frees up valuable resources in the gateway.

A home or business user accesses a broadband network through a DSL, Cable network, or T1 line with an Internet gateway having telephony ports to use for fax and voice transmissions over IP. The gateway can use a PCM (pulse code modulation) codec, but in the case of fax, ITU Recommendation T.38 that has significant advantages of being more reliable and saving bandwidth over PCM when sending fax data.

The present invention provides advantages over the prior art: the virtual fax module frees up the use of telephony ports for facsimile transmissions in a broadband access device; reduces DSP resource requirements for fax service in a broadband access device; provides for multiple faxes to be sent and/or received simultaneously; eliminates the need to run a physical wire from a PC for facsimile use; eliminates the need for the end user to have a fax modem in a receiving PC; eliminates the need for the end user to have a fax machine; and makes possible true high-speed fax transmissions between two end users having the virtual fax module in PCs with access to broadband networks.

BRIEF DESCRIPTION OF THE DRAWINGS

Preferred embodiments of the invention are discussed hereinafter in reference to the drawings, in which.

DETAILED DESCRIPTION OF THE INVENTION

There is described herein a technique for eliminating a telephony port and equivalent processor resources on a broadband network access gateway. The telephony port is otherwise used by a traditional analog fax machine or PC-based fax modem for facsimile transmission and reception. End users traditionally use either a stand alone fax machine or PC-based software application and fax modem to send and receive facsimile transmissions through the public switched telephone network (PSTN). When used herein, a "PC-based" software application refers to an application for sending faxes directly from any type of computing device, including personal computers, servers, and handheld computing devices.

Figure 1:
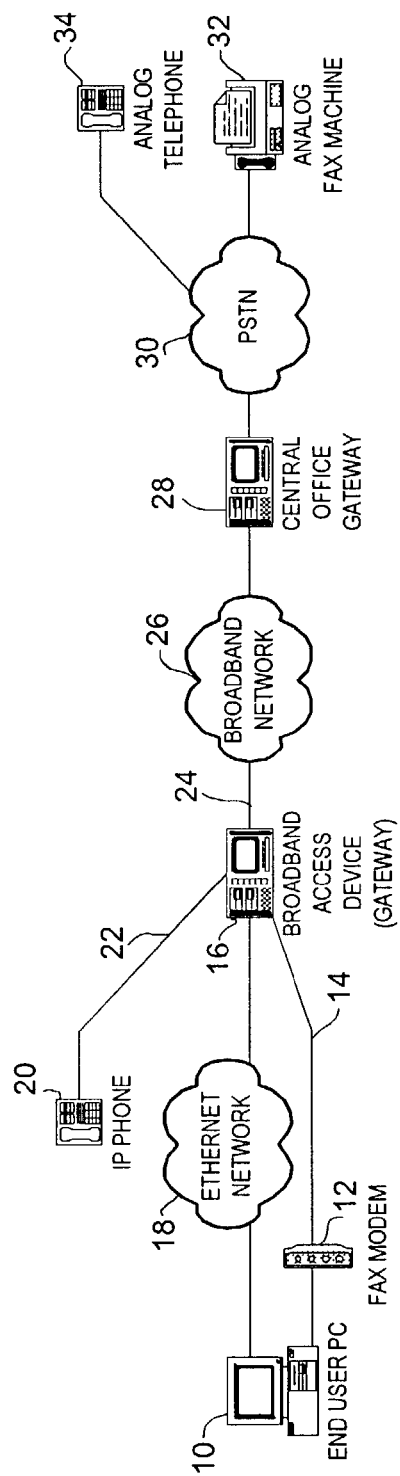
FIG. 1 is a diagram of a standard of a fax network configuration.

Referring to FIG. 1, an end user at a personal computer 10 sends and receives faxes through a PC-based software application using a fax modem 12. An end user can access a gateway 16 connected to a broadband network 26 with a fax modem 12 via an RJ11 telephony port 14. The gateway 16 connects to the broadband network with a high speed Internet connection 24 such as a digital subscriber line (DSL), cable modem 24, or T1/T5 line. The PC 10 is connected to gateway 16 with a network connection such as Ethernet 18. Gateway 16 has two telephony ports, one for voice and one for fax. An digital telephone 20 may also connect to gateway 16 through a telephony port 22. The broadband network 26 can include the public Internet, a managed local area network or wide area network (LAN/WAN) or a virtual LAN. Gateway 16 uses a codec to convert analog fax data from fax modem 12 into digital format, using protocols such as pulse code modulation (PCM) or ITU T.38 "Procedures for real-time Group 3 facsimile communication over IP networks", which is incorporated herein. Packetized T.38 facsimile data is then transmitted to a far-end gateway 28 that may be located at a central office (CO) of a telephone company.

As stated previously, the ITU has specified recommendation T.38 as a standard for carrying fax data over packet networks in realtime. While the preferred exemplary embodiment transmits data according T.38 protocols for fax over IP (FoIP), one skilled in the art will recognize that any system for sending facsimile data through a broadband access device over a digital network will fall within the teachings of the present invention. G3 and other standard fax protocols allow traditional fax devices to work seamlessly without any knowledge of the packet transport while at the same time improving reliability and reducing network bandwidth utilization and cost. Recommendation T.38 involves demodulating the signal in the access gateway, packetizing the data for transmission over the packet network, transmitting the data, and then remodulating it as per the fax protocol at the terminating side After reaching the far-end CO gateway, the packetized fax data is modulated from digital to analog signals for delivery to either a fax modem or a traditional analog fax machine that is attached on the PSTN 30.

Figure 2:
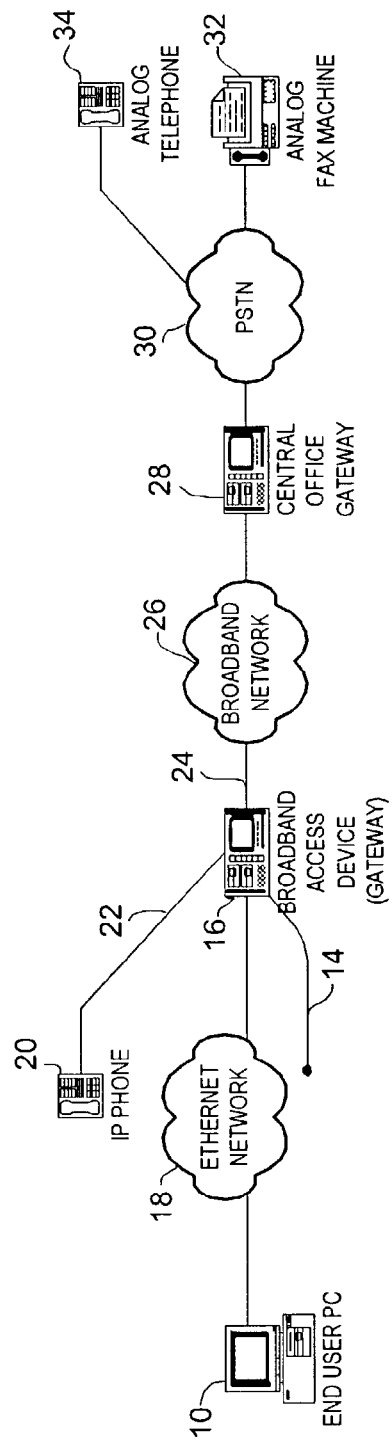
FIG. 2 is a diagram of the configuration of a virtual fax network configuration.

Reference is made to FIG. 2, where according to the preferred embodiment a PC 10 executes a fax transmission with any facsimile software application but without connecting a fax modem 12 from the PC 10 to a telephony port 14 on the broadband access gateway 16. FIG. 2 illustrates the connections of the broadband access gateway to a DSL or Cable network operating under DOCSIS protocols. The PC-based facsimile application sends the digital fax data to the same COM port it uses for a fax modem 12 (FIG. 1), at which time the serial port redirector grabs the data and sends it to gateway 16 using a TCP socket over the existing Ethernet connection 18 instead of the fax modem. By eliminating the fax modem, there is no longer a need to run a physical wire from a PC to a gateway for facsimile use. Gateway 16 receives the raw fax data from the PC application and encapsulates it using the T.38 protocols before transmitting the packetized data through the redirected serial port to gateway 16. The fax data is then sent over a broadband network 26 for reception by gateway 28.

The access gateway 16 provides a TCP server port that communicates with the port redirectors on client-side PC's 10. The gateway 16 has a software application associated with the port, which emulates a Class 1 or Class 2 fax modem interface from the client-side PC 10. By restricting the modem interface emulation on the gateway to a Class 1 interface only, the serverside application is simplified and the PC-based application can execute all the negotiations and complex operations associate with T.30 protocols. A Class 2 interface would require the serverside application to handle most of the T.30 negotiations alone and would require a more complex implementation.

The virtual fax module on the gateway translates various telephony events that are communicated via AT commands, such as hook events and the destination phone number, into appropriate signaling protocol messages that are dispatched to a call manager to establish and tear down the call. Similarly, after call establishment, the fax session steps through the various ITU T.30 protocols. Thereafter, the virtual fax module translates to and from T.38 protocol packets from the server side to AT commands and responses for the client side.

The virtual fax module reduces the use of processing resources in a gateway 16. Processing resources, such as MIPS (millions of instruction cycles per second) in a DSP, that are associated with telephony service in the gateway are conserved because modulation and demodulation of the fax data signal is not required. The gateway must only process T.38 packetized fax data. By eliminating modulation/demodulation errors that occur in a fax transmission device, the quality of fax transmissions improves.

Figure 3:
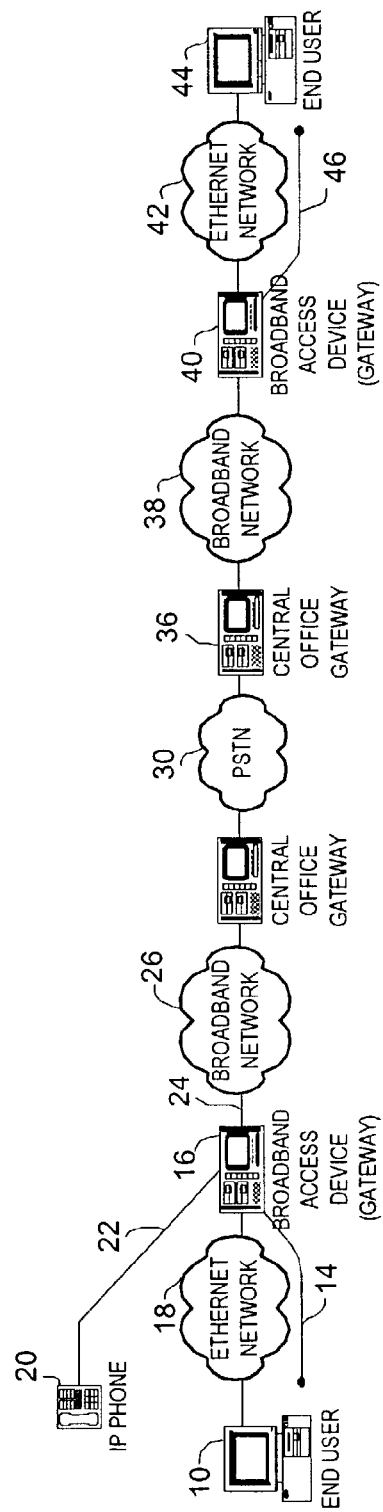
FIG. 3 is a diagram of a virtual fax network that receives faxes through an email server.

Referring to FIG. 3, a virtual fax module 10 can also be installed on a second end user's PC 44. The second PC 44 is also networked to a second broadband gateway 40 through a protocol such as Ethernet 42. Similar to the connection of the end user 10 to the PSTN 30 through a broadband network 26, gateway 40 connects to a broadband network 38 that is connected to the PSTN 30 through a CO gateway. The virtual fax module's serial port redirector transmits fax data between gateway 40 and a facsimile software application on PC 44 through Ethernet connection 42. This eliminates the need for the end user 44 to have a fax modem in a receiving PC for a fax send from first end user 10. Such a configuration also eliminates the need for the end user 44 to have a fax machine 32 connected to the PSTN 30 as in FIG. 2, which makes possible true high-speed digital fax transmissions.

Figure 4:
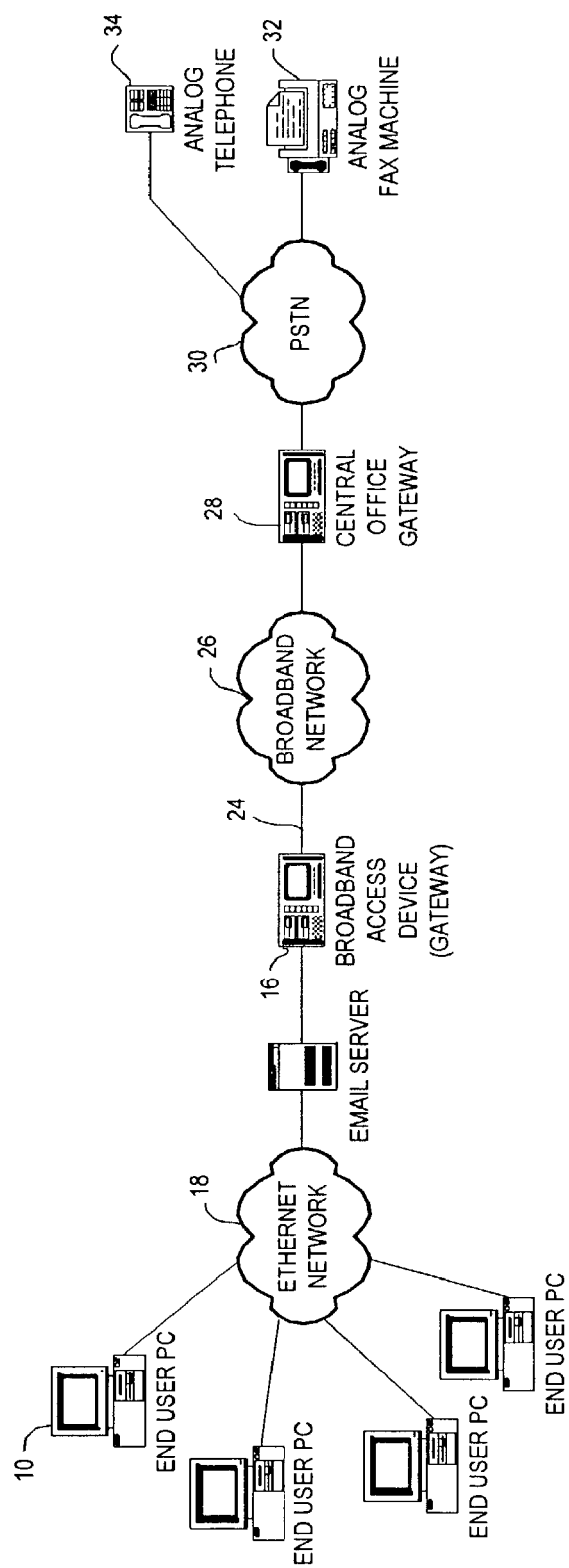
FIG. 4 is a diagram of a virtual fax network with a complete virtual fax application module is located in memory on a broadband gateway.

An alternative embodiment of the virtual fax is for use on a gateway in a business or corporate network in conjunction with a fax server or pool of fax modems. Referring to FIG. 4, instead of locating a virtual fax application module on a stand-alone PC that is networked to a gateway, a complete virtual fax application module is located in memory on a broadband gateway 36, thereby eliminating the need to have separate fax servers or fax modems. The application-loaded gateway can also use the mechanism specified in ITU T.37 to integrate with an Email system 36 to send faxes to each individual end user from an Email server. A gateway 36 is capable of providing numerous virtual telephony ports which allows assigning individual fax numbers to each user or group in a network, thereby eliminating the need for manual distribution of fax messages from a central location. Multiple ports on a gateway 36 also allows end users on a network to send and receive simultaneously.

Because many varing and different embodiments may be made within the scope of the invent concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method for transmitting a facsimile from a computer through a broadband network without using a facsimile modem, comprising:
   providing a near-end computer connected to a broadband network through a near-end access gateway;
   providing a facsimile software application in the near-end computer that operates by transmitting a facsimile over a serial communication port, associated with the software application to a facsimile modem;
   transmitting the facsimile using the software application by sending raw digital facsimile data to the serial communication port;
   using a serial port redirection command from the near-end computer to direct the raw digital facsimile data from the software application away from the serial communication port and through a TCP socket on an existing network connection between the near-end computer and the near-end gateway connected to the broadband network;
   providing a virtual facsimile software module in the near-end gateway that receives the raw digital facsimile data from the near-end computer over the network connection,
   wherein the near-end gateway emulates a facsimile modem interface and transmits the raw digital facsimile data over the broadband network to a far-end gateway that operates an additional virtual facsimile software module.

2. The method of claim 1, further comprising:
   encapsulating the data into packets according to the ITU Recommendation T.38 protocols at the gateway when transmitting the facsimile.

3. The method of claim 1, further comprising:
   encapsulates encapsulating the redirected raw digital facsimile data written to the serial communication port into a TCP socket for transmission to the near-end gateway and unencapsulates TCP data received from the near-end gateway through the TCP socket.

4. The method of claim 1, wherein the near-end gateway emulates a Class 1 or Class 2 facsimile modem interface communicates with the serial port redirector on the near-end computer without modulation or demodulation of the raw digital facsimile data.

5. The method of claim 1, further comprising:
   translating telephony events at the gateway that are communicated via AT commands into appropriate signaling protocol messages that are dispatched to the call manager to establish and tear down the call.

6. A system for transmitting a facsimile from a computer through a broadband network without using a facsimile modem, comprising:
   a near-end computer connected to a broadband network through a near-end access gateway, having a facsimile software application installed in memory that operates by transmitting a facsimile over a serial communication port, associated with the software application, to a facsimile modem;
   a far-end broadband network access gateway networked to a far-end computer;
   a processor programmed to execute the facsimile software application to transmit a facsimile, which sends raw digital facsimile data to the serial communication port, and
   is programmed to redirect the raw digital facsimile data from the facsimile software application away from the serial communication port and through a TCP socket on the network connection between the near-end computer and the near-end gateway,
   wherein the the raw digital facsimile data that is sent from the facsimile software to the serial communication port on the computer is redirected to a virtual facsimile module on the near-end gateway that emulates a facsimile modem interface and transmits the raw digital facsimile data over the broadband network to a far-end gateway that operates an additional virtual facsimile software module.

7. The system of claim 6, wherein:
   the serial port redirector encapsulates the redirected raw digital facsimile data written to the serial communication port into a TCP socket for transmission to the gateway and unencapsulates TCP data received from the gateway through the TCP socket.

8. The system of claim 6, wherein:
   the near-end gateway emulates a Class 1 Class 2 facsimile modem interface that communicates with the serial port redirector on the near-end computer without modulation or demodulation of the raw digital facsimile data.

9. The system of claim 6, wherein:

the virtual fax module translates telephony events at the gateway that are communicated via AT commands into appropriate signaling protocol messages that are dispatched to the call manager to establish and tear down the call.

10. The method of claim 1, wherein the transmission of the facsimile is completed without using a facsimile modem in the near-end computer or the near-end gateway.

11. The system of claim 6, wherein the transmission of the facsimile is completed without using a facsimile modem in the near-end computer or the near-end gateway.

* * * * *